US012606155B2

(12) United States Patent (10) Patent No.: US 12,606,155 B2
Tischendorf et al. (45) Date of Patent: Apr. 21, 2026

(54) CONTROLLER-DISTRIBUTED TORQUE CONTROL STRATEGY FOR EXTERNAL TORQUE REQUESTORS

(71) Applicant: FCA US LLC, Auburn Hills, MI (US)

(72) Inventors: Christoph Tischendorf, West Bloomfield, MI (US); Ashay Sharma, Troy, MI (US); Justin J Padinjaremury, Rochester Hills, MI (US); Nidirsh Patel, Farmington Hills, MI (US); Indrasen Karogal, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 256 days.

(21) Appl. No.: 18/526,462

(22) Filed: Dec. 1, 2023

(65) Prior Publication Data

US 2025/0178588 A1     Jun. 5, 2025

(51) Int. Cl.
*B60W 20/15* (2016.01)
*B60W 10/06* (2006.01)
*B60W 10/08* (2006.01)
*B60W 10/11* (2012.01)
*B60W 10/18* (2012.01)

(52) U.S. Cl.
CPC ............ *B60W 20/15* (2016.01); *B60W 10/06* (2013.01); *B60W 10/08* (2013.01); *B60W 10/11* (2013.01); *B60W 10/18* (2013.01); *B60W 2710/0605* (2013.01); *B60W 2710/0638* (2013.01)

(58) Field of Classification Search
None
See application file for complete search history.

(56) References Cited

U.S. PATENT DOCUMENTS

| | | | |
|---|---|---|---|
| 8,560,204 B2 | 10/2013 | Simon, Jr. et al. | |
| 9,334,815 B2 | 5/2016 | Cygan, Jr. et al. | |
| 9,388,758 B2 | 7/2016 | Pochner et al. | |
| 9,399,959 B2 | 7/2016 | Whitney et al. | |
| 9,429,085 B2 | 8/2016 | Whitney et al. | |
| 9,435,274 B2 | 9/2016 | Wong et al. | |

(Continued)

FOREIGN PATENT DOCUMENTS

| | | | | | |
|---|---|---|---|---|---|
| CA | 2702089 C | * | 1/2016 | ............ | B60L 1/003 |
| CN | 110573716 A | * | 12/2019 | ......... | F02D 41/0087 |

(Continued)

*Primary Examiner* — Shelley Chen

(74) *Attorney, Agent, or Firm* — Jeremy J. Klobucar

(57) ABSTRACT

A method for controlling a hybrid powertrain of a hybrid vehicle includes generating and outputting, by an external torque requestor connected to a network, a torque request for the hybrid powertrain both (i) to a hybrid control processor (HCP) connected to the network and (ii) directly to a set of fast-path torque actuators of the hybrid powertrain and, based on the torque request, optimizing and outputting, by the HCP, a slow-path torque request for a set of slow-path torque actuators of the hybrid powertrain and optimizing and outputting, by the HCP, limits for fast-path torque requests for the set of fast-path torque actuators of the hybrid powertrain, wherein outputting the torque request directly to the set of fast-path torque actuators bypasses the HCP and eliminates an inherent communication delay via the network thereby improving a torque response of the hybrid powertrain.

16 Claims, 3 Drawing Sheets

(56)  References Cited

U.S. PATENT DOCUMENTS

| | | | |
|---|---|---|---|
| 9,637,115 B2 | 5/2017 | Zhu et al. | |
| 2009/0204280 A1* | 8/2009 | Simon, Jr. | B60W 20/00 |
| | | | 180/65.265 |
| 2013/0015803 A1* | 1/2013 | Arnett | H02P 21/36 |
| | | | 318/503 |
| 2018/0355790 A1* | 12/2018 | Smiljanovski | F02M 35/10255 |
| 2019/0226391 A1* | 7/2019 | Buckland | F02B 39/10 |

FOREIGN PATENT DOCUMENTS

| | | | | |
|---|---|---|---|---|
| CN | 114851829 B | * | 12/2024 | B60W 50/06 |
| JP | 3376999 B2 | * | 2/2003 | |
| JP | 2004306827 A | * | 11/2004 | |

* cited by examiner

CONTROLLER-DISTRIBUTED TORQUE CONTROL STRATEGY FOR EXTERNAL TORQUE REQUESTORS

FIELD

The present application generally relates to hybrid powertrain torque control and, more particularly, to a controller-distributed torque control strategy for external torque requestors.

BACKGROUND

A hybrid powertrain includes an internal combustion engine and at least one electric motor that are each configured to generate torque. Some torque actuators are slow-path actuators (e.g., response slower than ~100 milliseconds, or ms) whereas other torque actuators are fast-path actuators (e.g., response faster than ~100 ms). For example, engine air/exhaust flow actuators are considered slow-path torque actuators and engine fuel/spark actuators and the electric motor(s) are considered fast-path torque actuators. The engine and the electric motor(s) typically have their own respective controllers or control units, and the hybrid powertrain typically includes a primary or supervisory controller that handles the arbitration and communication of torque requests to the individual controllers/control units. Each communication via a controller area network (CAN), however, has an inherent delay (e.g., ~70 ms). Accordingly, while such conventional hybrid powertrain control systems do work for their intended purpose, there exists an opportunity for improvement in the relevant art.

SUMMARY

According to one example aspect of the invention, a control system for a hybrid powertrain of a hybrid vehicle is presented. In one exemplary implementation, the control system comprises a hybrid control processor (HCP) connected to a network and configured to receive, from an external torque requestor also connected to the network, a torque request for the hybrid powertrain, optimize and output a slow-path torque request for a set of slow-path torque actuators of the hybrid powertrain, and optimize and output limits for fast-path torque requests for a set of fast-path torque actuators of the hybrid powertrain, and the external torque requestor, wherein the external torque requestor is configured to generate and output the torque request to both (i) the HCP and (ii) the set of fast-path torque actuators, wherein outputting the torque request directly to the set of fast-path torque actuators bypasses the HCP and eliminates an inherent communication delay via the network thereby improving a torque response of the hybrid powertrain.

In some implementations, the set of fast-path actuators includes fuel, spark, and cylinder valve actuators of an internal combustion engine that are controlled by an engine control module (ECM) connected to the network, and an electric motor controlled by a motor control processor (MCP) connected to the network. In some implementations, the set of slow-path torque actuators are air and/or exhaust flow actuators of the engine that are controlled by the ECM. In some implementations, the air and/or exhaust flow actuators include at least one of a throttle valve, a supercharger bypass valve, and a turbocharger valve or vane.

In some implementations, the external torque requestor is a transmission control module (TCM) configured to control a transmission of the hybrid powertrain, and wherein the transmission is configured to transfer drive torque generated by the hybrid powertrain to a driveline of the hybrid vehicle for propulsion. In some implementations, the TCM is configured to generate the torque request in connection with a shift operation between two different gears of the transmission. In other implementations, the external torque requestor is a brake system module (BSM) configured to control a brake system of the hybrid vehicle. In some implementations, the BSM is configured to generate the torque request in connection with a braking operation for stability control of the hybrid vehicle.

According to another example aspect of the invention, a method for controlling a hybrid powertrain of a hybrid vehicle is presented. In one exemplary implementation, the method comprises generating and outputting, by an external torque requestor connected to a network, a torque request for the hybrid powertrain both (i) to an HCP connected to the network and (ii) directly to a set of fast-path torque actuators of the hybrid powertrain, based on the torque request, optimizing and outputting, by the HCP, a slow-path torque request for a set of slow-path torque actuators of the hybrid powertrain, and optimizing and outputting, by the HCP, limits for fast-path torque requests for the set of fast-path torque actuators of the hybrid powertrain, and wherein outputting the torque request directly to the set of fast-path torque actuators bypasses the HCP and eliminates an inherent communication delay via the network thereby improving a torque response of the hybrid powertrain.

In some implementations, the set of fast-path actuators includes fuel, spark, and cylinder valve actuators of an internal combustion engine that are controlled by an ECM connected to the network, and an electric motor controlled by an MCP connected to the network. In some implementations, the set of slow-path torque actuators are air and/or exhaust flow actuators of the engine that are controlled by the ECM. In some implementations, the air and/or exhaust flow actuators include at least one of a throttle valve, a supercharger bypass valve, and a turbocharger valve or vane.

In some implementations, the external torque requestor is a TCM configured to control a transmission of the hybrid powertrain, and wherein the transmission is configured to transfer drive torque generated by the hybrid powertrain to a driveline of the hybrid vehicle for propulsion. In some implementations, the TCM is configured to generate the torque request in connection with a shift operation between two different gears of the transmission. In some implementations, the external torque requestor is a BSM configured to control a brake system of the hybrid vehicle. In some implementations, the BSM is configured to generate the torque request in connection with a braking operation for stability control of the hybrid vehicle.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, a hybrid powertrain includes an internal combustion engine and at least one electric motor that are each configured to generate torque. Some torque actuators are slow-path actuators (e.g., response slower than ~100 milliseconds, or ms) whereas other torque actuators are fast-path actuators (e.g., response faster than ~100 ms). For example, engine air/exhaust flow actuators are considered slow-path torque actuators and engine fuel/spark actuators and the electric motor(s) are considered fast-path torque actuators. The engine and the electric motor(s) typically have their own respective controllers or control units, and the hybrid powertrain typically includes a primary or supervisory controller that handles the arbitration and communication of torque requests to the individual controllers/control units. Each communication via a controller area network (CAN), however, has an inherent delay (e.g., ~70 ms). This delay could negatively impact shift quality as it may increase the time to shift gears inside a transmission, which reduces performance and could be noticeable to a driver of the hybrid vehicle. Accordingly, an improved control system and control method for a hybrid powertrain of a hybrid vehicle are presented herein.

The control system and method of the present application mitigate or eliminate communication delay during a torque intervention from an external controller (e.g., transmission control module (TCM) or brake system module (BSM)) which is caused by network messaging and the supervisory controller arbitrating torque requests. More particularly, the method improves communication delays for fast-path actuator torque requests. The control architecture for the hybrid powertrain control system is modified such that the torque request from an external torque requestor bypasses the supervisory controller and is provided directly to the fast-path torque actuators (e.g., via a respective engine/motor controller). Rather than arbitrating the external torque request for fast-path torque actuators, the supervisory controller instead only controls limits for the fast-path torque actuators. This strategy eliminates the CAN delay (e.g., ~70 ms) and any arbitration delay (e.g., ~25 ms) by the supervisory controller by directly commanding the fast-path torque actuators in the engine controller to satisfy the torque request.

Figure 1A:
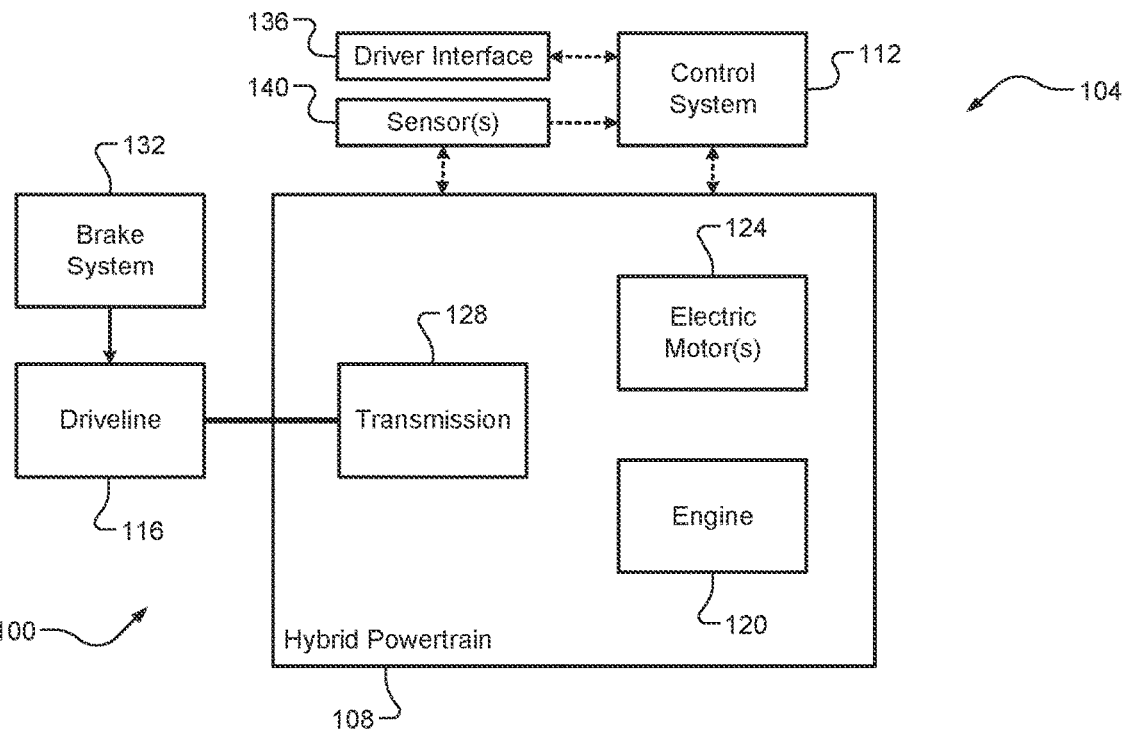
FIGS. 1A-1B are diagrams of a hybrid vehicle having an example hybrid powertrain control system and an example internal combustion engine of the hybrid powertrain according to the principles of the present application.
Figure 1B:
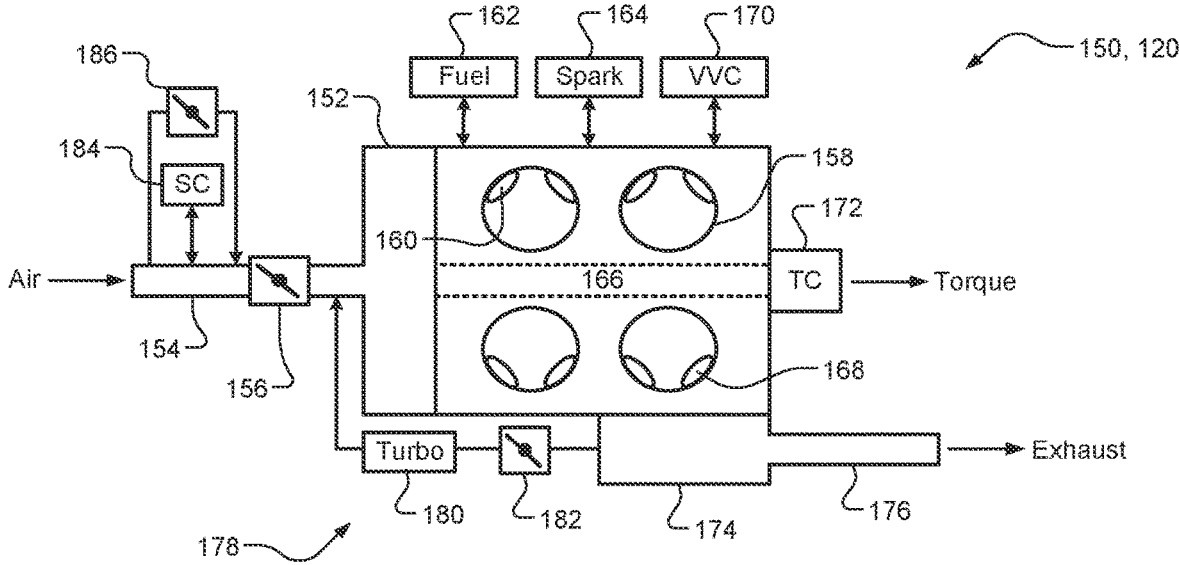

Referring now to FIGS. 1A-1B, diagrams of a hybrid vehicle having an example hybrid powertrain control system and an example internal combustion engine of the hybrid powertrain according to the principles of the present application are illustrated. In FIG. 1A, a functional block diagram of an example hybrid vehicle 100 is illustrated. The hybrid vehicle 100 includes a hybrid powertrain control system 104 that generally comprises a hybrid powertrain 108 and a controller or control system 112. The hybrid powertrain 108 is configured to generate and transfer drive torque to a driveline 116 for vehicle propulsion. The hybrid powertrain 108 generally comprises an internal combustion engine 120, one or more electric motors 124 (e.g., one or more electric traction motors), and a transmission 128 (e.g., a multi-speed automatic transmission).

It will be appreciated that the hybrid powertrain 108 could also include other non-illustrated components, such as a high voltage battery system for powering the electric motor(s) 124. A brake system 132, such as a friction brake system and/or a regenerative braking system, is configured to provide frictional brake force or negative torque to the driveline 116 to decelerate the hybrid vehicle 100.

The control system 112 is configured to control operation of the hybrid vehicle 100. This primarily includes controlling the hybrid powertrain 108 to generate an amount of drive torque to satisfy a torque request received via a driver interface 136 (e.g., an accelerator pedal). The control system 112 is configured to control the hybrid powertrain 108 based on measurements from one or more sensors, such as shaft speeds, component/fluid temperatures, fluid pressures, and the like.

In FIG. 1B, an example configuration 150 of the engine 120 is illustrated. The engine 120 draws air into an intake manifold 152 through an induction system 154 that is controlled by a throttle valve 156. The air in the intake manifold 152 is distributed to a plurality of cylinders 158 (air charges) via respective intake valves 160 and combined with liquid fuel (gasoline, diesel, etc.) from a fuel system 162 (a fuel tank, a fuel pump, a fuel rail, fuel injectors, etc.) to form a fuel/air mixture (fuel/air charges). In one exemplary implementation, the intake manifold 152 is a variable length intake manifold having a respective slow-path actuator or actuators for adjusting the length and, in turn, the volume of the intake manifold 152. The fuel/air charges are compressed by pistons (not shown) within the respective cylinders 158 and the compressed fuel/air charges are ignited by spark provided by a spark system 164 (ignition coils, spark plugs, etc.). The combustion of the compressed fuel/air mixtures within the cylinders 158 drives the respective pistons (not shown) and rotatably generates drive torque at a crankshaft 166.

Exhaust gas resulting from combustion of the compressed fuel/air charges is expelled from the cylinders 158 via respective exhaust valves 168. A variable valve control (VVC) system 170 controls a lift/timing of the intake/exhaust valves 160, 168 to adjust the torque generative capability of the engine 120. A flywheel or torque converter (TC) 172 is configured to selectively connect the crankshaft 166 to another shaft (e.g., the transmission 128) for torque transfer therebetween. The exhaust gas expelled from the cylinders 158 is gathered in an exhaust manifold 174.

An exhaust treatment system 176 treats the exhaust gas to mitigate or eliminate emissions before release into the atmosphere. In some implementations, the kinetic energy of the exhaust gas in the exhaust manifold is utilized to power a turbocharger system 178 including a turbocharger (turbo) 180, which has an associated wastegate or pressure (boost) control valve 182. In some implementations, the turbocharger 180 is a variable geometry turbocharger (VGT) and reference 182 represents a controllable vane to adjust the geometry. The turbocharger 180 is configured to force additional air through the induction system 154 and into the intake manifold 152, and this increased airflow could be utilized (e.g., with increased fuel) to generate more drive torque. In some implementations, the induction system 154 further includes a supercharger (SC) 184 (e.g., a scroll-type compressor) that forces additional air therethrough and into the intake manifold 152 and its pressure/boost is controlled by a bypass valve 186.

Figure 2:
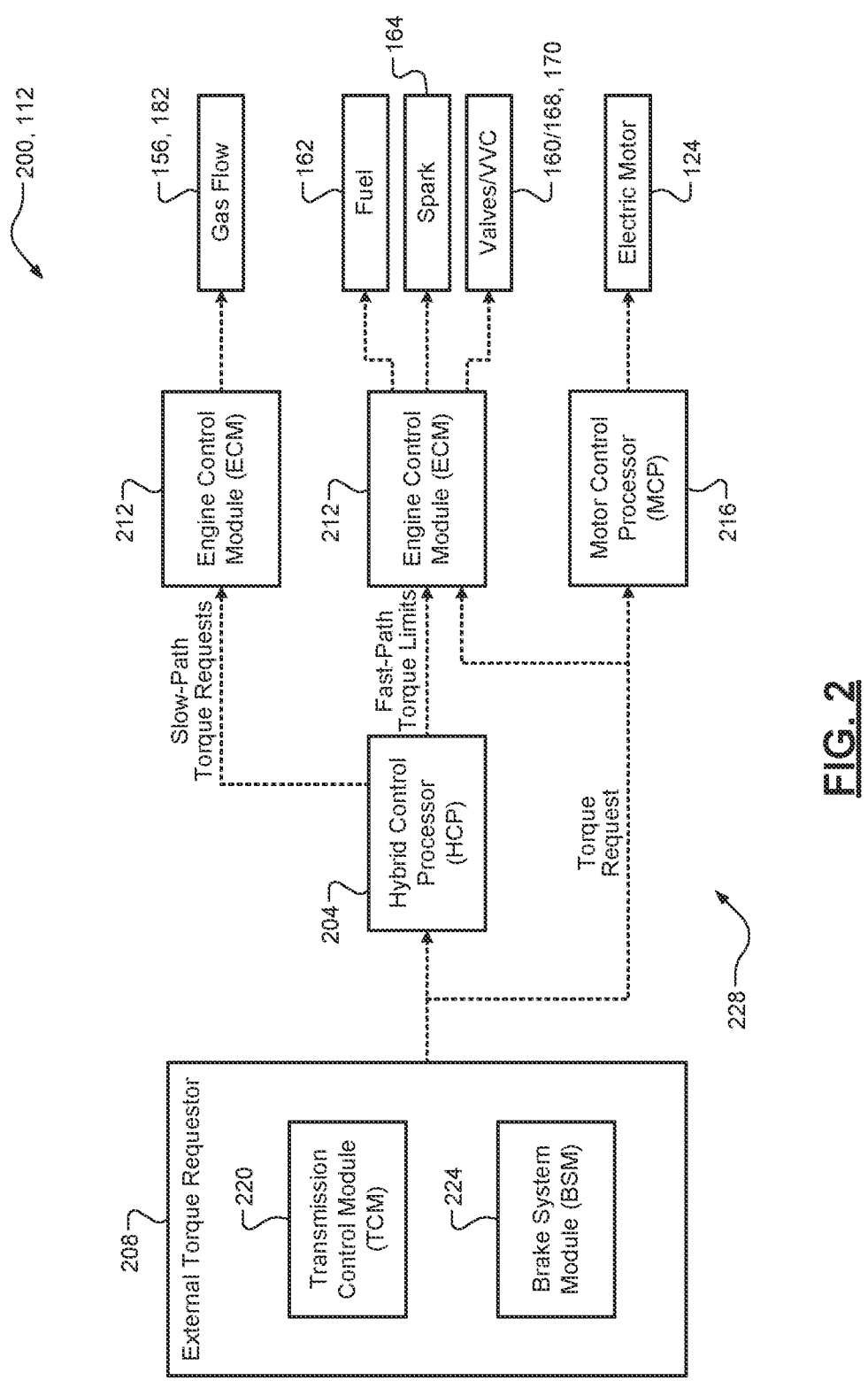
FIG. 2 is a functional block diagram of an example architecture for a control system of a hybrid powertrain of a hybrid vehicle according to the principles of the present application.

FIG. 2 is a functional block diagram of an example architecture 200 for a control system of a hybrid powertrain of a hybrid vehicle according to the principles of the present application. While the hybrid vehicle 100 and the engine 120, 150 of FIGS. 1A-1B are specifically referenced for illustrative/descriptive purposes, it will be appreciated that this example architecture 200 could be applicable to other suitably configured hybrid powertrain control systems. As shown, the control system 112 primarily includes a supervisory controller, also referred to as a hybrid control processor (HCP) 204. The HCP 204 is generally configured to arbitrate torque requests for the hybrid powertrain 108.

An external torque requestor 208 is configured to generate and output/provide a torque request for the hybrid powertrain 108, which are executable by an engine control module (ECM) 212 configured to control the engine 120 and/or a motor control processor (MCP) 216 configured to control the electric motor(s) 124. This torque request could also be referred to as an intervening or intervention torque request as it could be a torque request that is not from a driver (e.g., via the driver interface 136, but is instead from another system of the hybrid vehicle 100 based on a change or desired change in operating conditions.

Two non-limiting examples of the external torque requestor 208 are a TCM 220 configured to control the transmission 128 and a BSM 224 configured to control vehicle stability systems, including the brake system 132 and others. In the example of the external torque requestor 208 being the TCM 220, the TCM 220 could generate the torque request during or in anticipation of a shift between two different gears of the transmission 128 (e.g., a downshift operation where torque/speed needs to be increased for shaft speed synchronization). In the example of the external torque requestor 208 being the BSM 224, the BSM 224 could generate the torque request during an electronic stability control (ESC) event (e.g., commanded by a body control module, or BCM), such as braking (via the brake system 132) during launch control or wheel/tire slippage.

It will be appreciated that these are merely two examples of the external torque requestor and that any torque request could be handled by the control system/method of the present application. All of these components/modules 204-224 are connected to and configured to communicate (e.g., via messaging) on a network 228 (e.g., a CAN, a local interconnect network (LIN), Ethernet, FlexRay, or any combination thereof). As shown, the torque request is provided to the HCP 204 but also bypasses the HCP 204 and is provided directly to the ECM 212 and the MCP 216.

This is because, for fast-path torque actuators, the arbitration delay caused by the HCP 204 acting as a "middleman" delays the satisfaction of the torque request via fast-path actuator(s), if possible. Instead, the HCP 204 only provides torque limits for the fast-path torque actuators, such as hardware limits/constraints. The terms "fast-path torque actuator" and "slow-path torque actuator" have been previously discussed herein. These fast-path torque actuators include, for example only, fuel (fuel system 162), spark (spark system 164), cylinder valves (valves 160/168 or VVC system 170), and the electric motor 124 as controlled by the ECM 212 or the MCP 216. The slow-path torque actuators, on the other hand, include, for example only, air (throttle valve 156 and/or bypass valve 186 for supercharger 184) and exhaust (turbo valve 182) flows. The HCP 204 is still configured to arbitrate and pass through slow-path torque requests as the minimal additional CAN/arbitration delay is unlikely to negatively impact the torque response in these cases. By bypassing the HCP 204 for fast-path torque requests, however, the control system 112 is able to significantly improve torque response of the hybrid powertrain 108, which could be noticeable and appreciated by a driver of the hybrid vehicle 100.

Figure 3:
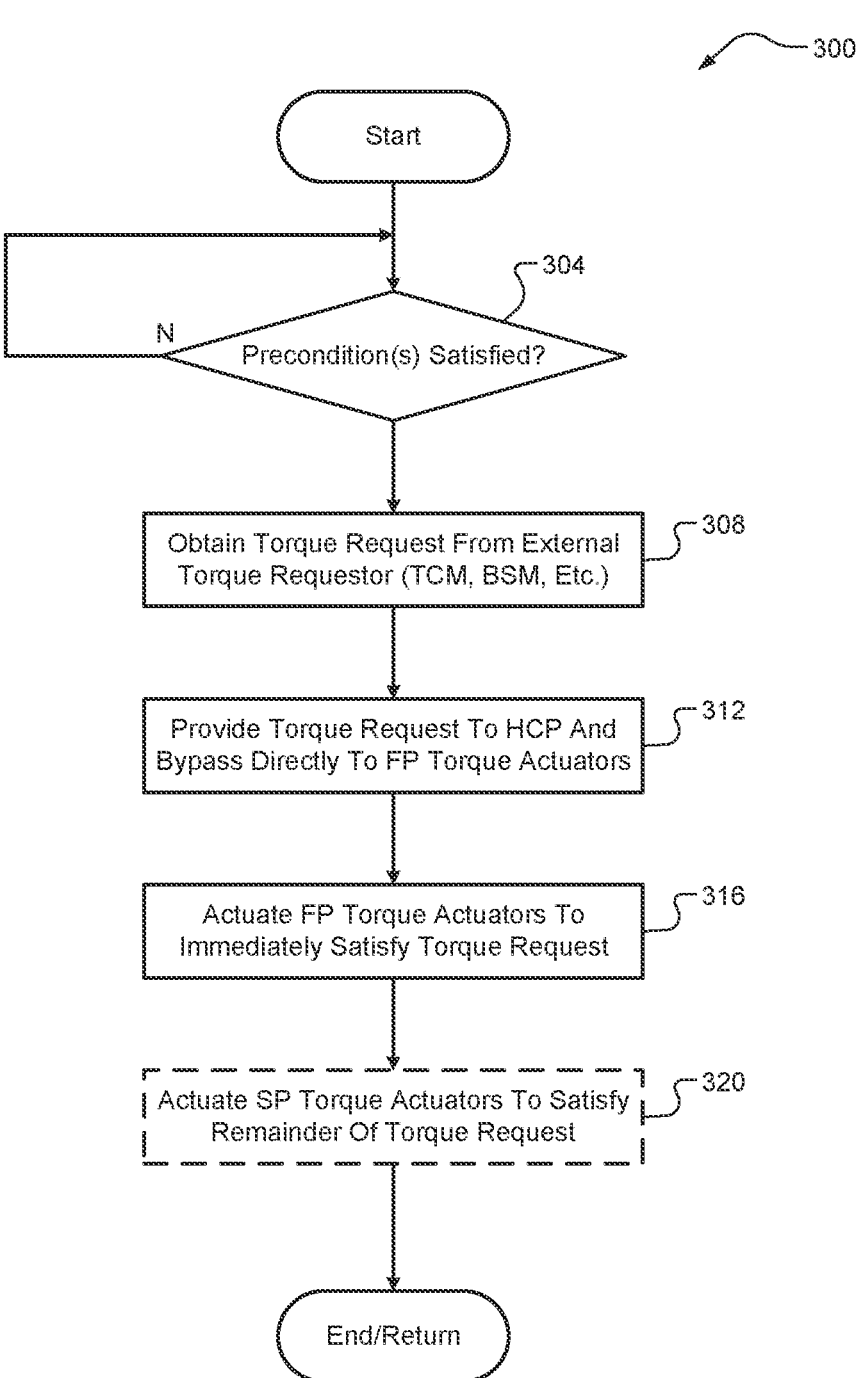
FIG. 3 is a flow diagram of an example method for controlling a hybrid powertrain of a hybrid vehicle according to the principles of the present application.

Referring now to FIG. 3, a flow diagram of an example control method 300 for a hybrid powertrain of a hybrid vehicle according to the principles of the present application are illustrated. While the components of the example hybrid vehicle 100, the example engine 150, and the example control system architecture 200 are specifically referenced for illustrative/descriptive purposes, it will be appreciated that the control method 300 could be applicable to any suitably configured hybrid vehicle. At 304, the control system 112 determines whether an optional set of one or more preconditions are satisfied. These precondition(s) could include, for example only, the hybrid powertrain 108 being powered up and the engine 120 running and there being no malfunctions or faults present that would otherwise inhibit or negatively impact the operation of the control method 300. When false, the method 300 ends or returns to 304. When true, the method 300 proceeds to 308. At 308, the control system 112 obtains the torque request from the external torque requestor 208. At 312, the torque request is provided both to the HCP 204 and directly to the fast-path torque actuators (e.g., via the ECM 212 and/or the MCP 216). At 316, the fast-path torque actuators begin satisfying the torque request. After a delay at optional 320 (if necessary), the slow-path torque actuators complete the satisfaction of the torque request. The method 300 then ends or returns to 304 for one or more additional cycles.

It will be appreciated that the terms "controller" and "control unit" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for a hybrid powertrain of a hybrid vehicle, the control system comprising:
   a hybrid control processor (HCP) connected to a network and configured to:
   receive, from an external torque requestor also connected to the network, a torque request for the hybrid powertrain,
   optimize and output a slow-path torque request for a set of slow-path torque actuators of the hybrid powertrain, and
   optimize and output limits for fast-path torque requests for a set of fast-path torque actuators of the hybrid powertrain; and the external torque requestor, wherein the external torque requestor is configured to generate and output the torque request to both (i) the HCP and (ii) the set of fast-path torque actuators, wherein outputting the torque request directly to the set of fast-path torque actuators bypasses the HCP and eliminates an inherent communication delay via the network thereby improving a torque response of the hybrid powertrain.

2. The control system of claim 1, wherein the set of fast-path actuators includes:

fuel, spark, and cylinder valve actuators of an internal combustion engine that are controlled by an engine control module (ECM) connected to the network; and an electric motor controlled by a motor control processor (MCP) connected to the network.

3. The control system of claim 2, wherein the set of slow-path torque actuators are air and/or exhaust flow actuators of the engine that are controlled by the ECM.

4. The control system of claim 3, wherein the air and/or exhaust flow actuators include at least one of a throttle valve, a supercharger bypass valve, and a turbocharger valve or vane.

5. The control system of claim 1, wherein the external torque requestor is a transmission control module (TCM) configured to control a transmission of the hybrid powertrain, and wherein the transmission is configured to transfer drive torque generated by the hybrid powertrain to a driveline of the hybrid vehicle for propulsion.

6. The control system of claim 5, wherein the TCM is configured to generate the torque request in connection with a shift operation between two different gears of the transmission.

7. The control system of claim 1, wherein the external torque requestor is a brake system module (BSM) configured to control a brake system of the hybrid vehicle.

8. The control system of claim 7, wherein the BSM is configured to generate the torque request in connection with a braking operation for stability control of the hybrid vehicle.

9. A method for controlling a hybrid powertrain of a hybrid vehicle, the method comprising:

generating and outputting, by an external torque requestor connected to a network, a torque request for the hybrid powertrain both (i) to a hybrid control processor (HCP)

connected to the network and (ii) directly to a set of fast-path torque actuators of the hybrid powertrain;

based on the torque request:

optimizing and outputting, by the HCP, a slow-path torque request for a set of slow-path torque actuators of the hybrid powertrain, and optimizing and outputting, by the HCP, limits for fast-path torque requests for the set of fast-path torque actuators of the hybrid powertrain; and wherein outputting the torque request directly to the set of fast-path torque actuators bypasses the HCP and eliminates an inherent communication delay via the network thereby improving a torque response of the hybrid powertrain.

10. The control method of claim 9, wherein the set of fast-path actuators includes:

fuel, spark, and cylinder valve actuators of an internal combustion engine that are controlled by an engine control module (ECM) connected to the network; and an electric motor controlled by a motor control processor (MCP) connected to the network.

11. The control method of claim 10, wherein the set of slow-path torque actuators are air and/or exhaust flow actuators of the engine that are controlled by the ECM.

12. The control method of claim 11, wherein the air and/or exhaust flow actuators include at least one of a throttle valve, a supercharger bypass valve, and a turbocharger valve or vane.

13. The control method of claim 9, wherein the external torque requestor is a transmission control module (TCM) configured to control a transmission of the hybrid powertrain, and wherein the transmission is configured to transfer drive torque generated by the hybrid powertrain to a driveline of the hybrid vehicle for propulsion.

14. The control method of claim 13, wherein the TCM is configured to generate the torque request in connection with a shift operation between two different gears of the transmission.

15. The control method of claim 9, wherein the external torque requestor is a brake system module (BSM) configured to control a brake system of the hybrid vehicle.

16. The control method of claim 15, wherein the BSM is configured to generate the torque request in connection with a braking operation for stability control of the hybrid vehicle.

* * * * *